US010873527B2

(12) United States Patent
Yang et al.

(10) Patent No.: US 10,873,527 B2
(45) Date of Patent: Dec. 22, 2020

(54) LINK PROTECTION METHOD IN SDN, SWITCHING DEVICE, AND NETWORK CONTROLLER

(71) Applicant: Huawei Technologies Co., Ltd., Shenzhen (CN)

(72) Inventors: Peilin Yang, Nanjing (CN); Hengcheng Zhang, Nanjing (CN); Tao Han, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 72 days.

(21) Appl. No.: 15/668,484

(22) Filed: Aug. 3, 2017

(65) Prior Publication Data

US 2017/0359253 A1 Dec. 14, 2017

Related U.S. Application Data

(63) Continuation of application No. PCT/CN2016/072787, filed on Jan. 29, 2016.

(30) Foreign Application Priority Data

Feb. 3, 2015 (CN) .......................... 2015 1 0057341

(51) Int. Cl.
*H04L 12/703* (2013.01)
*H04L 12/911* (2013.01)
(Continued)

(52) U.S. Cl.
CPC .......... *H04L 45/28* (2013.01); *H04L 41/0663* (2013.01); *H04L 41/0668* (2013.01);
(Continued)

(58) Field of Classification Search
CPC .......... H04L 29/08297; H04L 41/0686; H04L 41/0668; H04L 41/0836; H04L 41/0663;
(Continued)

(56) References Cited

U.S. PATENT DOCUMENTS

2007/0165515 A1   7/2007  Vasseur
2009/0175274 A1*  7/2009  Aggarwal ........... H04L 12/1886
                                                          370/390
(Continued)

FOREIGN PATENT DOCUMENTS

CN     103973676 A    8/2014
CN     103986651 A    8/2014
(Continued)

OTHER PUBLICATIONS

Foreign Communication From a Counterpart Application, European Application No. 16746112.8, Extended European Search Report dated Jan. 11, 2018, 9 pages.
(Continued)

*Primary Examiner* — Joshua Kading
(74) *Attorney, Agent, or Firm* — Conley Rose, P.C.

(57) ABSTRACT

A link protection method in a software-defined networking (SDN), a corresponding switching device and network controller, where the method includes receiving, by a first switching device in the SDN, first information from a network controller in the SDN and link protection information, where the first information establishes a communication link between the first switching device and a destination device, and the link protection information instructs the first switching device to proactively perform primary-to-secondary link switching when a link is faulty, establishing, by the first switching device, the communication link with the destination device according to the first information, and determining, by the first switching device according to the link protection information, that the first switching device proactively performs the primary-to-secondary link switching.

20 Claims, 5 Drawing Sheets

(51) Int. Cl.
  *H04L 12/24* (2006.01)
  *H04L 12/707* (2013.01)
  *H04L 12/715* (2013.01)
  *H04L 12/46* (2006.01)
  *H04L 12/721* (2013.01)

(52) U.S. Cl.
  CPC .......... *H04L 41/0836* (2013.01); *H04L 45/22* (2013.01); *H04L 45/64* (2013.01); *H04L 47/728* (2013.01); *H04L 47/746* (2013.01); *H04L 12/4641* (2013.01); *H04L 45/38* (2013.01)

(58) Field of Classification Search
  CPC ..... H04L 69/40; H04L 63/0272; H04L 45/28; H04L 45/64; H04L 45/22; H04L 45/38; H04L 47/746; H04L 47/728; H04L 12/4641
  See application file for complete search history.

(56) References Cited

U.S. PATENT DOCUMENTS

| | | | | |
|---|---|---|---|---|
| 2014/0146664 A1* | 5/2014 | Amante | ................ | H04L 45/50 370/228 |
| 2014/0280834 A1 | 9/2014 | Medved et al. | | |
| 2014/0334286 A1* | 11/2014 | Ernstrom | ................ | H04L 45/04 370/216 |
| 2015/0372898 A1* | 12/2015 | Haramaty | ............. | H04L 49/557 370/225 |
| 2016/0226701 A1* | 8/2016 | Luo | ........................ | H04L 41/12 |
| 2016/0308787 A1* | 10/2016 | Ahn | ........................ | H04L 49/00 |

FOREIGN PATENT DOCUMENTS

| | | |
|---|---|---|
| CN | 104283738 A | 1/2015 |
| CN | 104301146 A | 1/2015 |
| KR | 20140072343 A | 6/2014 |

OTHER PUBLICATIONS

Machine Translation and Abstract of Chinese Publication No. CN103973676, Aug. 6, 2014, 20 pages.
Machine Translation and Abstract of Chinese Publication No. CN103986651, Aug. 13, 2014, 12 pages.
Machine Translation and Abstract of Chinese Publication No. CN104283738, Jan. 14, 2015, 15 pages.
Machine Translation and Abstract of Chinese Publication No. CN104301146, Jan. 21, 2015, 17 pages.
Machine Translation and Abstract of Korean Publication No. KR20140072343, Jun. 13, 2014, 15 pages.
Foreign Communication From a Counterpart Application, PCT Application No. PCT/CN2016/072787, English Translation of International Search Report dated Mar. 24, 2016, 2 pages.
Foreign Communication From a Counterpart Application, PCT Application No. PCT/CN2016/072787, English Translation of Written Opinion dated Mar. 24, 2016, 5 pages.

* cited by examiner

LINK PROTECTION METHOD IN SDN, SWITCHING DEVICE, AND NETWORK CONTROLLER

CROSS-REFERENCE TO RELATED APPLICATIONS

This application is a continuation of International Patent Application No. PCT/CN2016/072787 filed on Jan. 29, 2016, which claims priority to Chinese Patent Application No. 201510057341.7 filed on Feb. 3, 2015. The disclosures of the aforementioned applications are hereby incorporated by reference in their entireties.

TECHNICAL FIELD

The present disclosure relates to the communications field, and in particular, to a link protection method in a software-defined networking (SDN), a switching device, and a network controller.

BACKGROUND

SDN is an emerging network architecture. In an SDN, a control plane and a data plane are separate, and the control plane can be directly programmed. In a previous network architecture, the control plane is tightly bound to each independent network device. That is, a network device generally has both a control function and a forwarding function. However, in the SDN, a control plane and a data plane of the network device are separate in order to flexibly control network traffic.

A link protection manner generally used in a conventional network is shown in FIG. 1. In FIG. 1, a customer edge (CE) is dual-homed to a provider edge router (PE)1 and a PE2. A primary link is established between the PE1 and a PE3, and a secondary link is established between the PE2 and the PE3. For each device in FIG. 1, a control plane and a data plane are integrated into one device. When the primary link between the PE1 and the PE3 is faulty, a link between the CE and the PE3 is automatically switched to the secondary link between the PE2 and the PE3 in order to ensure normal forwarding on the link and avoid service interruption resulting from the fault in the link between the PE1 and the PE3.

For the SDN, definitions to a control plane and a data plane of an SDN device have not been completed. Therefore, there is no developed link switching manner in the current architecture.

SUMMARY

Embodiments of the present disclosure provide a link protection method in an SDN, a switching device, and a network controller to resolve a technical problem that there is no developed link switching manner in the SDN.

According to a first aspect of the present disclosure, a link protection method in an SDN is provided, including receiving, by a first switching device in the SDN, first information sent by a network controller in the SDN and link protection information, where the first information is used to establish a communication link between the first switching device and a destination device, and the link protection information is used to instruct the first switching device to proactively perform primary-to-secondary link switching when a link is faulty, establishing, by the first switching device, the communication link with the destination device according to the first information, and determining, by the first switching device according to the link protection information, that the first switching device proactively performs the primary-to-secondary link switching.

With reference to the first aspect, in a first possible implementation manner of the first aspect, establishing, by the first switching device, the communication link with the destination device according to the first information includes establishing, by the first switching device, the communication links with both a first destination device and a second destination device according to the first information, where the communication link established between the first switching device and the first destination device is a primary link, and the communication link established between the first switching device and the second destination device is a secondary link.

With reference to the first possible implementation manner of the first aspect, in a second possible implementation manner of the first aspect, determining, by the first switching device according to the link protection information, that the first switching device proactively performs the primary-to-secondary link switching includes determining, by the first switching device, that the primary link between the first switching device and the first destination device is faulty, and switching, by the first switching device, a working link from the primary link to the secondary link according to the link protection information.

With reference to the second possible implementation manner of the first aspect, in a third possible implementation manner of the first aspect, determining, by the first switching device, that the primary link between the first switching device and the first destination device is faulty includes determining, by the first switching device by means of detection, that the primary link between the first switching device and the first destination device is faulty, or receiving, by the first switching device, a fault notification message sent by the network controller, where the notification message is used to notify the first switching device that the primary link between the first switching device and the first destination device is faulty.

With reference to the second possible implementation manner or the third possible implementation manner of the first aspect, in a fourth possible implementation manner of the first aspect, after switching, by the first switching device, a working link from the primary link to the secondary link, the method further includes sending, by the first switching device, a switching notification message to the network controller, to notify the network controller that the first switching device has switched the working link from the primary link to the secondary link.

According to a second aspect of the present disclosure, a link protection method in an SDN is provided, including obtaining, by a network controller in the SDN, first information and link protection information, where the first information is used to establish a communication link between a first switching device in the SDN and a destination device, the link protection information is used to instruct the first switching device to proactively automatically perform primary-to-secondary link switching when a link is faulty, and the first switching device is controlled by the network controller, and sending, by the network controller, the first information and the link protection information to the first switching device.

With reference to the second aspect, in a first possible implementation manner of the second aspect, after the sending, by the network controller, the first information and the link protection information to the first switching device, the method further includes receiving, by the network controller, a switching notification message sent by the first switching device, where the switching notification message is used to notify the network controller that the first switching device has switched a working link from the primary link to the secondary link.

With reference to the first possible implementation manner of the second aspect, in a second possible implementation manner of the second aspect, before the receiving, by the network controller, a switching notification message sent by the first switching device, the method further includes detecting, by the network controller, the primary link, and sending, by the network controller, a fault notification message to the first switching device when determining, by means of detection, that the primary link is faulty.

With reference to the second aspect or the first possible implementation manner or the second possible implementation manner of the second aspect, in a third possible implementation manner of the second aspect, obtaining, by a network controller in the SDN, first information includes performing, by the network controller, protocol negotiation with both a first destination device and a second destination device to negotiate for establishment of communications networks with both the first destination device and the second destination device, where the communication link is a link corresponding to the communications network, and obtaining, by the network controller, a network link signaling negotiation result after completing the negotiation with the first destination device and the second destination device, and using the network link signaling negotiation result as the first information or a part of the first information.

According to a third aspect of the present disclosure, a switching device is provided, including a receiving module configured to receive first information sent by a network controller in an SDN and link protection information, where the first information is used to establish a communication link between the switching device and a destination device, and the link protection information is used to instruct the switching device to proactively perform primary-to-secondary link switching when a link is faulty, and an operation module configured to establish the communication link with the destination device according to the first information, and determine, according to the link protection information, that the switching device proactively performs the primary-to-secondary link switching.

With reference to the third aspect, in a first possible implementation manner of the third aspect, that an operation module is configured to establish the communication link with the destination device according to the first information includes establishing the communication links with both a first destination device and a second destination device according to the first information, where the communication link established between the operation module and the first destination device is a primary link, and the communication link established between the operation module and the second destination device is a secondary link.

With reference to the first possible implementation manner of the third aspect, in a second possible implementation manner of the third aspect, that the operation module determines, according to the link protection information, that the switching device proactively performs the primary-to-secondary link switching includes determining that the primary link between the operation module and the first destination device is faulty, and switching a working link from the primary link to the secondary link according to the link protection information.

With reference to the second possible implementation manner of the third aspect, in a third possible implementation manner of the third aspect, that the operation module is configured to determine that the primary link between the operation module and the first destination device is faulty includes determining, by means of detection, that the primary link between the operation module and the first destination device is faulty, or receiving a fault notification message sent by the network controller, where the notification message is used to notify the switching device that the primary link between the switching device and the first destination device is faulty.

With reference to the second possible implementation manner or the third possible implementation manner of the third aspect, in a fourth possible implementation manner of the third aspect, the switching device further includes a sending module configured to send a switching notification message to the network controller after the operation module switches the working link from the primary link to the secondary link, to notify the network controller that the switching device has switched the working link from the primary link to the secondary link.

According to a fourth aspect of the present disclosure, a network controller is provided, including an obtaining module configured to obtain first information and link protection information, where the first information is used to establish a communication link between a first switching device in an SDN and a destination device, the link protection information is used to instruct the first switching device to proactively automatically perform primary-to-secondary link switching when a link is faulty, and the first switching device is controlled by the network controller, and a sending module configured to send the first information and the link protection information to the first switching device.

With reference to the fourth aspect, in a first possible implementation manner of the fourth aspect, the network controller further includes a receiving module configured to receive, after the sending module sends the first information and the link protection information to the first switching device, a switching notification message sent by the first switching device, where the switching notification message is used to notify the network controller that the first switching device has switched a working link from the primary link to the secondary link.

With reference to the first possible implementation manner of the fourth aspect, in a second possible implementation manner of the fourth aspect, the network controller further includes a detection module configured to detect the primary link before the receiving module receives the switching notification message sent by the first switching device, and the sending module is further configured to send a fault notification message to the first switching device when it is determined, by means of detection, that the primary link is faulty.

With reference to the fourth aspect or the first possible implementation manner or the second possible implementation manner of the fourth aspect, in a third possible implementation manner of the fourth aspect, the obtaining module is further configured to perform protocol negotiation with both a first destination device and a second destination device, to negotiate for establishment of communications networks with both the first destination device and the second destination device, where the communication link is a link corresponding to the communications network, and obtain a network link signaling negotiation result after completing the negotiation with the first destination device and the second destination device, and use the network link signaling negotiation result as the first information or a part of the first information.

According to a fifth aspect, a switching device is provided, including a memory, a processor, and a receiver that are connected to one bus, where the memory is configured to store an instruction, the receiver is configured to receive first information sent by a network controller in an SDN and link protection information, where the first information is used to establish a communication link between the switching device and a destination device, and the link protection information is used to instruct the switching device to proactively perform primary-to-secondary link switching when a link is faulty, and the processor is configured to execute the instruction, establish the communication link with the destination device according to the first information, and determine, according to the link protection information, that the switching device proactively performs the primary-to-secondary link switching.

With reference to the fifth aspect, in a first possible implementation manner of the fifth aspect, that the processor is configured to establish the communication link with the destination device according to the first information includes establishing the communication links with both a first destination device and a second destination device according to the first information, where the communication link established between the processor and the first destination device is a primary link, and the communication link established between the processor and the second destination device is a secondary link.

With reference to the first possible implementation manner of the fifth aspect, in a second possible implementation manner of the fifth aspect, that the processor is configured to determine, according to the link protection information, that the switching device proactively performs the primary-to-secondary link switching includes determining that the primary link between the processor and the first destination device is faulty, and switching a working link from the primary link to the secondary link according to the link protection information.

With reference to the second possible implementation manner of the fifth aspect, in a third possible implementation manner of the fifth aspect, that the processor is further configured to determine that the primary link between the processor and the first destination device is faulty includes determining, by means of detection, that the primary link between the processor and the first destination device is faulty, or receiving a fault notification message sent by the network controller, where the notification message is used to notify the switching device that the primary link between the switching device and the first destination device is faulty.

With reference to the second possible implementation manner or the third possible implementation manner of the fifth aspect, in a fourth possible implementation manner of the fifth aspect, the switching device further includes a transmitter connected to the bus, and the transmitter is configured to send a switching notification message to the network controller after the processor switches the working link from the primary link to the secondary link to notify the network controller that the switching device has switched the working link from the primary link to the secondary link.

According to a sixth aspect, a network controller is provided, including a memory, a processor, and a transmitter that are connected to one bus, where the memory is configured to store an instruction. The processor is configured to execute the instruction, and obtain first information and link protection information, where the first information is used to establish a communication link between a first switching device in an SDN and a destination device, the link protection information is used to instruct the first switching device to proactively automatically perform primary-to-secondary link switching when a link is faulty, and the first switching device is controlled by the network controller, and the transmitter is configured to send the first information and the link protection information to the first switching device.

With reference to the sixth aspect, in a first possible implementation manner of the sixth aspect, the network controller further includes a receiver connected to the bus, and the receiver is configured to receive, after the transmitter sends the first information and the link protection information to the first switching device, a switching notification message sent by the first switching device, where the switching notification message is used to notify the network controller that the first switching device has switched a working link from the primary link to the secondary link.

With reference to the first possible implementation manner of the sixth aspect, in a second possible implementation manner of the sixth aspect, the processor is further configured to execute the instruction, detect the primary link before the receiver receives the switching notification message sent by the first switching device, and send a fault notification message to the first switching device using the transmitter when determining, by means of detection, that the primary link is faulty.

With reference to the sixth aspect or the first possible implementation manner or the second possible implementation manner of the sixth aspect, in a third possible implementation manner of the sixth aspect, the processor is further configured to perform protocol negotiation with both a first destination device and a second destination device, to negotiate for establishment of communications networks with both the first destination device and the second destination device, where the communication link is a link corresponding to the communications network, and obtain a network link signaling negotiation result after completing the negotiation with the first destination device and the second destination device, and use the network link signaling negotiation result as the first information or a part of the first information.

In the embodiments of the present disclosure, when sending first information to a switching device, a network controller in an SDN also sends link protection information. The link protection information is used to instruct the switching device to proactively perform primary-to-secondary link switching, that is, a primary-to-secondary link switching function is proactively completed by the switching device. In this way, the switching device can automatically perform the primary-to-secondary link switching according to the link protection information, instead of performing the primary-to-secondary link switching after receiving a command from the network controller when a link is faulty (the network controller detects whether the link is faulty) or performing the primary-to-secondary link switching after requesting the network controller when a link is faulty (the switching device detects whether the link is faulty). Therefore, time required for primary-to-secondary link switching and a delay caused by the primary-to-secondary link switching are reduced, and service smoothness is ensured as much as possible.

DESCRIPTION OF EMBODIMENTS

In SDN in which a control plane and a data plane are separate, a device (may also be referred to as an SDN device in the embodiments of the present disclosure) includes an SDN controller (SNC) and a forwarding device (also referred to as a switching device). The SNC and the switching device may be in a one-to-many relationship, that is, one SNC may control multiple switching devices. A main function of the SNC is to allocate and schedule a network resource, control a protocol, manage a topology, formulate a policy, deliver an entry, and the like for the switching device. The switching device is mainly responsible for forwarding a packet according to control information delivered by the SNC using a southbound interface, and performing some other tasks.

In the embodiments of the present disclosure, the switching device may refer to, for example, a switch or another device with a packet forwarding function.

Figure 1:
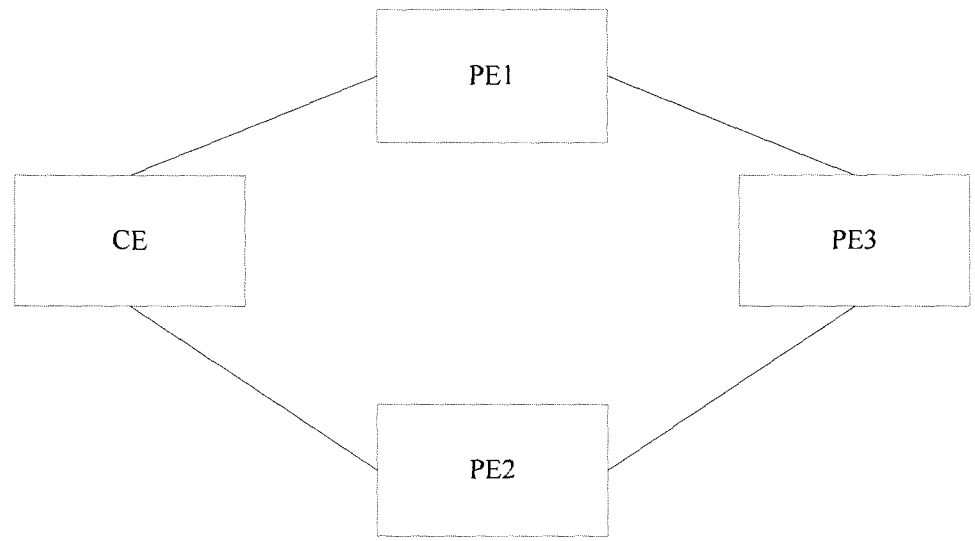
FIG. 1 is a schematic diagram of link protection on a conventional network.
Figure 2:
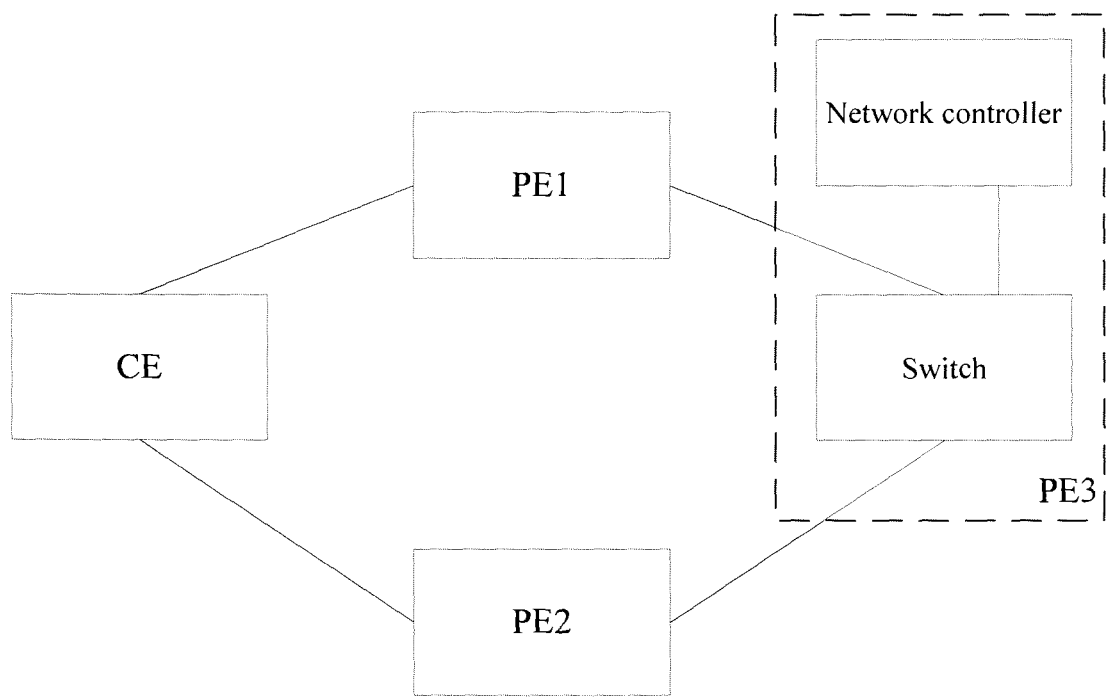
FIG. 2 is a schematic diagram of link protection in an SDN according to an embodiment of the present disclosure.

Referring to FIG. 2, FIG. 2 is a schematic diagram of link protection in an SDN according to an embodiment of the present disclosure. In FIG. 2, a CE is dual-homed to a PE1 and a PE2. A primary link is established between the PE1 and a PE3, and a secondary link is established between the PE2 and the PE3. For the CE, the PE1, and the PE2 in FIG. 2, a control plane and a data plane are integrated into one device, which means that the CE, the PE1, and the PE2 are all conventional devices. However, the PE3 is a device on which a control plane and a data plane are separate, which means that the PE3 is an SDN device.

In the embodiments of the present disclosure, the SNC may not only control a switching device shown in FIG. 2 and may alternatively control one or more other switching devices, but the one or more other switching devices are not shown in FIG. 2 in detail. Therefore, the switching device controlled by the SNC and shown in FIG. 2 is referred to as a first switching device in the embodiments of the present disclosure.

In the embodiments of the present disclosure, the SNC may control one or more switching devices, and therefore, the SDN device PE3 may include only one switching device (that is, the first switching device), meaning that on an SDN network, one SNC may control multiple switching devices. However, in the embodiments of the present disclosure, the SNC is also considered as a part of the PE3, that is, the SDN device PE3 includes the SNC and the first switching device. For example, the SNC further controls a second switching device, and therefore, an SDN device in which the second switching device is included may also include the second switching device and the SNC.

Strictly speaking, the SDN shown in FIG. 2 is an SDN in a transition phase, and only the PE3 is an SDN device. Over a relatively long period of time, the SDN in a transition phase has relatively wide applications and undergoes gradual transition to a pure SDN network only after technologies are mature, meaning that devices in FIG. 2 may all be SDN devices. In the embodiments of the present disclosure, a network shown in FIG. 2 is considered as the SDN as a whole, and the devices shown in FIG. 2 are all considered located in the SDN.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects unless otherwise specified.

The following further describes the embodiments of the present disclosure in detail with reference to the accompanying drawings of this specification.

Figure 3:
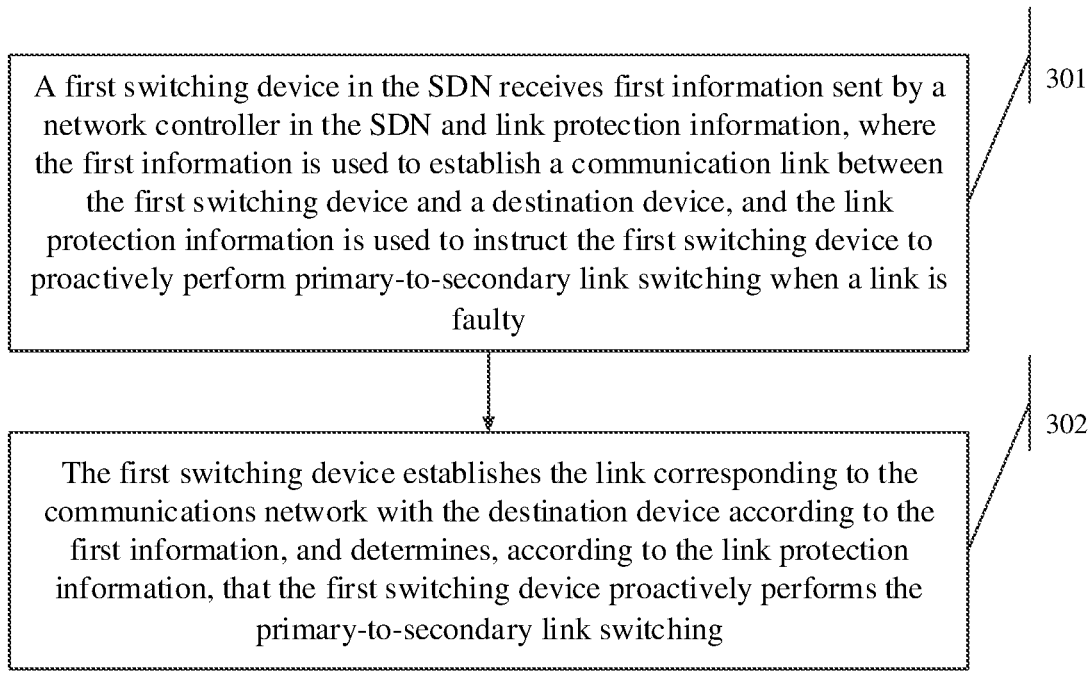
FIG. 3 is a main flowchart of a link protection method in an SDN according to an embodiment of the present disclosure.

Referring to FIG. 3, an embodiment of the present disclosure provides a link protection method in an SDN. A specific hardware architecture in FIG. 2 is used as an example. A main process of the method is described as follows.

Step 301: A first switching device in the SDN receives first information sent by a network controller in the SDN and link protection information, where the first information is used to establish a communication link between the first switching device and a destination device, and the link protection information is used to instruct the first switching device to proactively perform primary-to-secondary link switching when a link is faulty.

In this embodiment of the present disclosure, the first switching device is an edge switching device in the SDN and may support fault detection and proactive primary-to-secondary link switching.

In this embodiment of the present disclosure, to make a network of the architecture in FIG. 2 work normally, communications networks first need to be established between the PE3 and the PE1 and between the PE3 and the PE2. For example, a Layer 2 (L2) virtual private network (VPN) (L2VPN) may be established between the PE3 and the PE1 and between the PE3 and the PE2, or a virtual private local area network (LAN) service (VPLS) may be established between the PE3 and the PE1 and between the PE3 and the PE2. This embodiment of the present disclosure imposes no limitation on the specific established communications network, as long as the communications network can work normally. The communication link is a link corresponding to the communications network.

Establishing the communications networks between the PE3 and the PE1 and between the PE3 and the PE2 further refers to establishing communications networks between the SNC and the PE1 and between the SNC and the PE2. The SNC (that is, the network controller in FIG. 2) first configures corresponding information and the SNC performs protocol negotiation for establishment of the communications networks with both the PE1 and the PE2 according to the configured information. In this embodiment of the present disclosure, the information configured by the SNC is referred to as negotiation information. After configuration is completed, the SNC first performs the protocol negotiation for the establishment of the communications networks with the PE1 and the PE2 according to the negotiation information.

For example, the negotiation information may include address information of the PE1 and the PE2 and type information of to-be-established links. The negotiation information may further include one or more of interface information of a link to be established between a switching device (that is, the first switching device in this embodiment of the present disclosure) and the PE1, interface information of a link to be established between the switching device and the PE2, control word information, a redundancy protection manner, or a method such as load balancing. The negotiation information may further include policy information of a link tunnel type. Certainly, the negotiation information may further include other possible information, as long as the information is used for the protocol negotiation for the establishment of the communications network with the PE1 and the PE2.

The type information of the to-be-established links may include, for example, one or more of information about a VPLS type, local circuit cross connect (CCC), remote CCC, single-end or multi-end, static or dynamic, or the like.

In this embodiment of the present disclosure, after the SNC completes configuring the negotiation information, the SNC may perform the protocol negotiation for the establishment of the communications networks with both the PE1 and the PE2 according to the negotiation information. After the protocol negotiation with both the PE1 and the PE2 is completed, the SNC obtains a network link signaling negotiation result. The SNC may use the network link signaling negotiation result as the first information or a part of the first information, and deliver the first information to the first switching device. In addition, the SNC may generate the link protection information and also deliver the link protection information to the first switching device. There may be a random sequence for delivering the first information and the link protection information by the SNC.

Alternatively, the SNC may use link configuration information as the first information or a part of the first information, and deliver the first information and the link protection information to the first switching device.

Further, the first information may include the network link signaling negotiation result and/or the link configuration information. The first information is used to establish the communication link between the first switching device and the destination device.

Further, the first information may include one or more of the type information of the to-be-established links, status information of the to-be-established links, or link attribute information, or the like.

The type information of the to-be-established links may include, for example, information about the VPLS type, the local CCC, the remote CCC, the single-end, the multi-end, or the like.

The status information of the to-be-established links may include information about state up, state down, state management down, or the like.

The link attribute information may include, for example, one or more of information about an access controller (AC) side link, an AC bound interface, a pseudowire (PW) side link, PW incoming label information, PW outgoing label information, peer address information, a time to live (TTL) value, a maximum transmission unit (MTU), a link encapsulation type, or the like.

After receiving the first information, the first switching device may establish the communication links with both the PE1 and the PE2 according to the first information.

The link protection information is used to notify the first switching device that the first switching device has the initiative in performing the primary-to-secondary link switching. That is, when a link is faulty, the first switching device can directly perform the primary-to-secondary link switching, with no need to exchange information with the SNC. Therefore, a link switching speed is increased.

Step 302: The first switching device establishes the link corresponding to the communications network with the destination device according to the first information, and determines, according to the link protection information, that the first switching device proactively performs the primary-to-secondary link switching.

After receiving the first information, the first switching device may establish the communication links with both the PE1 and the PE2 according to the first information. After receiving the link protection information, the first switching device may determine that the first switching device has the initiative in performing the primary-to-secondary link switching.

Optionally, in this embodiment of the present disclosure, establishing, by the first switching device, the communication link with the destination device according to the first information includes establishing, by the first switching device, the communication links with both a first destination device and a second destination device according to the first information, where the communication link established between the first switching device and the first destination device is a primary link, and the communication link established between the first switching device and the second destination device is a secondary link.

In this embodiment of the present disclosure, for example, the PE1 is the first destination device, and the PE2 is the second destination device. That is, the first switching device establishes communication links with both the PE1 and the PE2. The communication link between the first switching device and the PE1 is the primary link, and the communication link between the first switching device and the PE2 is the secondary link. After the communication link is established, the first switching device may first communicate with the CE using the primary link.

Optionally, in this embodiment of the present disclosure, determining, by the first switching device according to the link protection information, that the first switching device proactively performs the primary-to-secondary link switching includes determining, by the first switching device, that the primary link between the first switching device and the first destination device is faulty, and switching, by the first switching device, a working link from the primary link to the secondary link according to the link protection information.

In this embodiment of the present disclosure, when the first switching device determines that the primary link between the first switching device and the PE1 is faulty, the first switching device proactively switches to the secondary link, and continues communicating with the CE using the secondary link, avoiding communication interruption. In addition, the first switching device directly switches the link, instead of switching after waiting for a command from the SNC or switching the link after requesting the SNC. Therefore, link switching efficiency is improved, service smoothness is ensured as much as possible, and a delay caused by the link switching is reduced.

In this embodiment of the present disclosure, determining, by the first switching device, that the primary link between the first switching device and the first destination device is faulty includes determining, by the first switching device by means of detection, that the primary link between the first switching device and the first destination device is faulty, or receiving, by the first switching device, a fault notification message sent by the network controller, where the notification message is used to notify the first switching device that the primary link between the first switching device and the first destination device is faulty.

In this embodiment of the present disclosure, detecting whether the link is faulty may be performed by the first switching device. For example, a link detection protocol (for example, a bidirectional forwarding detection (BFD) or the International Telecommunication Union (ITU) Telecommunication Standardization Sector (ITU-T) Y.1731) may be configured between the first switching device and the PE1 and between the first switching device and the PE2 for detection. Alternatively, detecting whether the link is faulty may be performed by the SNC. For example, a link detection protocol (for example, the BFD or the ITU-T Y.1731) may be configured between the SNC and the PE1 and between the SNC and the PE2 for detection, or may be performed in a manner such as sending a heartbeat packet. The present disclosure imposes no limitation on a specific detection manner.

If the first switching device detects whether the link is faulty, the first switching device directly switches to the secondary link when detecting that the primary link is faulty, with no need to exchange information with the SNC in the period. Therefore, link switching efficiency is improved.

If the SNC detects whether the link is faulty, the SNC sends the fault notification message to the first switching device when detecting that the primary link is faulty. The first switching device can know that the primary link is faulty when receiving the fault notification message, and switches to the secondary link.

Further, in this embodiment of the present disclosure, after switching, by the first switching device, a working link from the primary link to the secondary link, the method further includes sending, by the first switching device, a switching notification message to the network controller to notify the network controller that the first switching device has switched the working link from the primary link to the secondary link.

After the first switching device switches the working link from the primary link to the secondary link, the first switching device sends the switching notification message to the SNC. After receiving the switching notification message, the SNC performs corresponding processing. In this case, a specific processing manner of the SNC is similar to that in other approaches, and details are not described herein.

Figure 4:
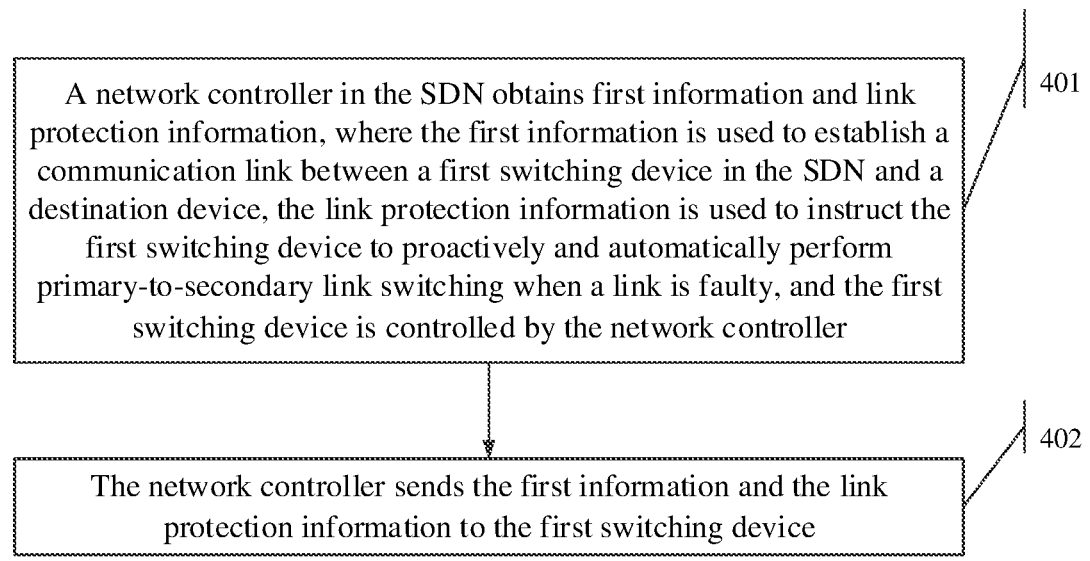
FIG. 4 is a main flowchart of another link protection method in an SDN according to an embodiment of the present disclosure.

Referring to FIG. 4, based on a same inventive concept, an embodiment of the present disclosure provides another link protection method in an SDN. Still refer to the architecture in FIG. 2. A main process of the method is described as follows.

Step 401: A network controller in the SDN obtains first information and link protection information, where the first information is used to establish a communication link between a first switching device in the SDN and a destination device, the link protection information is used to instruct the first switching device to proactively and automatically perform primary-to-secondary link switching when a link is faulty, and the first switching device is controlled by the network controller.

The first information may include a network link signaling negotiation result and/or link configuration information. For example, the link configuration information is generated by the SNC.

Optionally, in this embodiment of the present disclosure, obtaining, by a network controller in the SDN, first information includes performing, by the network controller, protocol negotiation with both a first destination device and a second destination device, to negotiate for establishment of communications networks with both the first destination device and the second destination device, where the communication link is a link corresponding to the communications network, and obtaining, by the network controller, a network link signaling negotiation result after completing the negotiation with the first destination device and the second destination device, and setting the network link signaling negotiation result as the first information or a part of the first information.

If the first information includes only the network link signaling negotiation result, the network controller uses the network link signaling negotiation result as the first information. If the first information further includes other information, for example, the link configuration information, the network controller uses the network link signaling negotiation result as a part of the first information.

For example, the first destination device is still the PE1, and the second destination device is still the PE2. In this embodiment of the present disclosure, after completing configuring negotiation information, the SNC may perform the protocol negotiation for establishment of the communications networks with the PE1 and the PE2. After the protocol negotiation is completed, the SNC may obtain the first information and deliver the first information to the first switching device. After receiving the first information, the first switching device may establish a primary link with the PE1 and a secondary link with the PE2 according to the first information.

In addition, the SNC may generate the link protection information and also deliver the link protection information to the first switching device. After receiving the link protection information, the first switching device may determine that the first switching device has the initiative in performing the primary-to-secondary link switching.

Step 402: The network controller sends the first information and the link protection information to the first switching device.

Optionally, in this embodiment of the present disclosure, after sending, by the network controller, the first information and the link protection information to the first switching device, the method further includes receiving, by the network controller, a switching notification message sent by the first switching device, where the switching notification message is used to notify the network controller that the first switching device has switched a working link from the primary link to the secondary link.

In this embodiment of the present disclosure, if the first switching device performs the primary-to-secondary link switching, the first switching device sends a notification message to the SNC after the switching is completed. In this embodiment of the present disclosure, the notification message is referred to as the switching notification message. The SNC knows that the first switching device has performed the primary-to-secondary link switching after receiving the switching notification message, and the SNC performs corresponding processing.

Optionally, in this embodiment of the present disclosure, before receiving, by the network controller, a switching notification message sent by the first switching device, the method further includes detecting, by the network controller, the primary link, and sending, by the network controller, a fault notification message to the first switching device when determining, by means of detection, that the primary link is faulty.

If the SNC is responsible for detecting whether the link is faulty, the SNC detects the primary link when the primary link is in a working state. If the SNC detects that the primary link is faulty, the SNC sends a notification message to the first switching device. In this embodiment of the present disclosure, the notification message is referred to as the fault notification message. The first switching device knows that the primary link is faulty after receiving the fault notification message. The first switching device performs the primary-to-secondary link switching. After switching is completed, the first switching device sends the switching notification message to the SNC. If the SNC is responsible for the detection, there may be more detection manners, and detection results are more accurate.

Certainly, if the first switching device is responsible for detecting whether the link is faulty, the first switching device directly performs the primary-to-secondary link switching when detecting that the primary link is faulty, and sends the switching notification message to the SNC after the switching is completed, meaning that the SNC does not need to perform detection. If the first switching device performs the detection, a link switching speed is higher, and switching time is reduced.

Implementation details that are not described in the process in FIG. 4 have been described in the process in FIG. 3, and reference may be made to the descriptions of FIG. 3.

Figure 5:
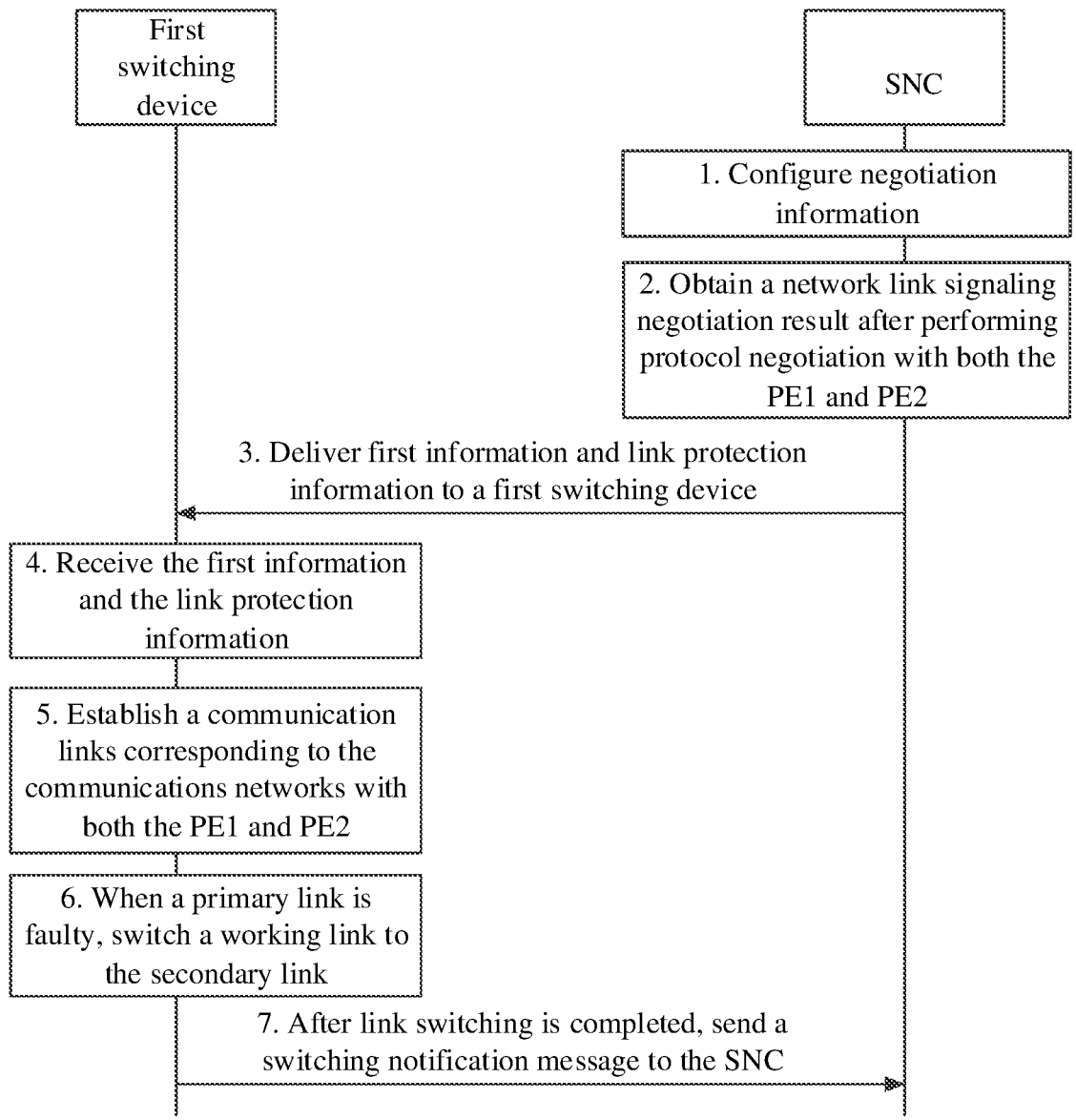
FIG. 5 is an interaction flowchart of a link protection method in an SDN according to an embodiment of the present disclosure.

To better describe a complete process of the present disclosure, refer to FIG. 5. FIG. 5 is an interaction flowchart of a link protection method in an SDN according to an embodiment of the present disclosure. In FIG. 5, the architecture in FIG. 2 is also used as an example.

Step 1. An SNC in the SDN configures negotiation information. The negotiation information is used by the SNC to perform protocol negotiation for establishment of communications networks with both the PE1 and the PE2.

Step 2. The SNC performs the protocol negotiation for establishment of communications networks with both the PE1 and the PE2 according to the negotiation information to obtain a network link signaling negotiation result.

Step 3. The SNC delivers first information and link protection information to a first switching device in the SDN. The first information includes the network link signaling negotiation result and/or link configuration information, and the link configuration information and the link protection information are generated by the SNC.

Step 4. The first switching device receives the first information and the link protection information.

Step 5. The first switching device establishes, according to the first information, communication links corresponding to the communications networks with both the PE1 and the PE2. The link established between the first switching device and the PE1 is a primary link, and the link established between the first switching device and the PE2 is a secondary link.

Step 6. When the primary link is faulty, the first switching device proactively switches a working link to the secondary link. Link detection may be completed by the SNC or the first switching device.

Step 7. After the link switching is completed, the first switching device sends a switching notification message to the SNC. The switching notification message is used to notify the SNC that the first switching device has switched the working link from the primary link to the secondary link.

Figure 6:
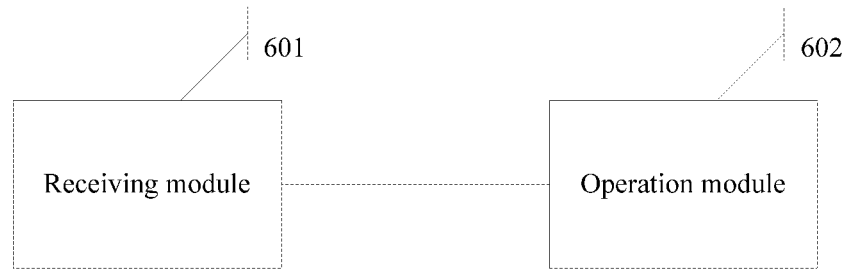
FIG. 6 is a structural block diagram of a first switching device according to an embodiment of the present disclosure.

Referring to FIG. 6, based on a same inventive concept, an embodiment of the present disclosure provides a switching device in an SDN. The switching device may include a receiving module 601 and an operation module 602. The switching device is the first switching device described above.

The receiving module 601 is configured to receive first information sent by a network controller in the SDN and link protection information. The first information is used to establish a communication link between the switching device and a destination device. The link protection information is used to instruct the switching device to proactively perform primary-to-secondary link switching when a link is faulty.

The operation module 602 is configured to establish the communication link with the destination device according to the first information, and determine, according to the link protection information, that the switching device proactively performs the primary-to-secondary link switching.

Optionally, in this embodiment of the present disclosure, that the operation module 602 is configured to establish the communication link with the destination device according to the first information includes establishing the communication links with both a first destination device and a second destination device according to the first information, where the communication link established between the operation module 602 and the first destination device is a primary link, and the communication link established between the operation module 602 and the second destination device is a secondary link.

Optionally, in this embodiment of the present disclosure, that the operation module 602 determining, according to the link protection information, that the switching device proactively performs the primary-to-secondary link switching includes determining that the primary link between the operation module 602 and the first destination device is faulty, and switching a working link from the primary link to the secondary link according to the link protection information.

Optionally, in this embodiment of the present disclosure, that the operation module 602 configured to determine that the primary link between the operation module 602 and the first destination device is faulty includes determining, by means of detection, that the primary link between the operation module 602 and the first destination device is faulty, or receiving a fault notification message sent by the network controller, where the notification message is used to notify the switching device that the primary link between the switching device and the first destination device is faulty.

Optionally, in this embodiment of the present disclosure, the switching device further includes a sending module (not shown) configured to send a switching notification message to the network controller after the operation module 602 switches the working link from the primary link to the secondary link to notify the network controller that the switching device has switched the working link from the primary link to the secondary link.

Figure 7:
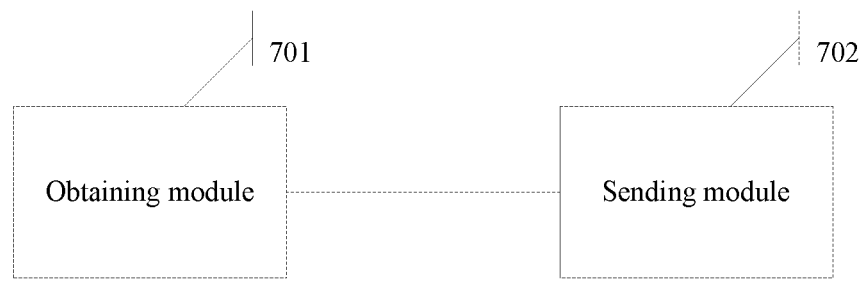
FIG. 7 is a structural block diagram of a network controller according to an embodiment of the present disclosure.

Referring to FIG. 7, based on a same inventive concept, an embodiment of the present disclosure provides a network controller in an SDN. The network controller may include an obtaining module 701 and a sending module 702.

The obtaining module 701 is configured to obtain first information and link protection information. The first information is used to establish a communication link between a first switching device in the SDN and a destination device. The link protection information is used to instruct the first switching device to proactively automatically perform primary-to-secondary link switching when a link is faulty. The first switching device is controlled by the network controller.

The sending module 702 is configured to send the first information and the link protection information to the first switching device.

Optionally, in this embodiment of the present disclosure, the network controller further includes a receiving module (not shown) configured to receive, after the sending module 702 sends the first information and the link protection information to the first switching device, a switching notification message sent by the first switching device, where the switching notification message is used to notify the network controller that the first switching device has switched a working link from the primary link to the secondary link.

Optionally, in this embodiment of the present disclosure, the network controller further includes a detection module configured to detect the primary link before the receiving module receives the switching notification message sent by the first switching device. The sending module 702 is further configured to send a fault notification message to the first switching device when it is determined, by means of detection, that the primary link is faulty.

Optionally, in this embodiment of the present disclosure, the obtaining module 701 is further configured to perform protocol negotiation with both a first destination device and a second destination device to negotiate for establishment of communications networks with both the first destination device and the second destination device, where the communication link is a link corresponding to the communications network, and obtain a network link signaling negotiation result after completing the negotiation with the first destination device and the second destination device, and set the network link signaling negotiation result as the first information or a part of the first information.

Figure 8:
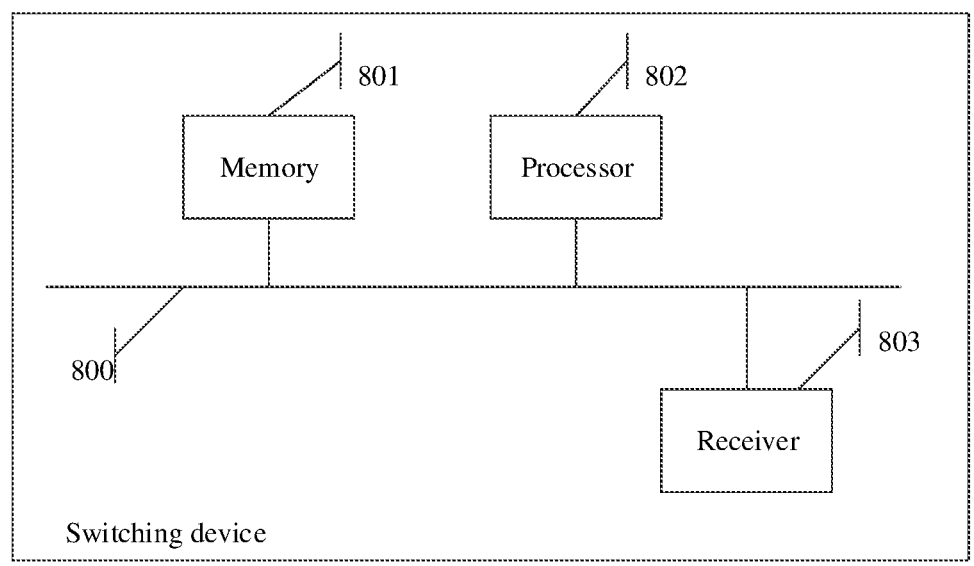
FIG. 8 is a schematic structural diagram of a switching device according to an embodiment of the present disclosure.

Referring to FIG. 8, based on a same inventive concept, an embodiment of the present disclosure provides a switching device in an SDN. The switching device includes a memory 801, a processor 802, and a receiver 803 that are connected to a bus 800. The switching device is the first switching device described above.

The memory 801 is configured to store an instruction required for performing a task by the processor 802.

The receiver 803 is configured to receive first information sent by a network controller in the SDN and link protection information. The first information is used to establish a communication link between the switching device and a destination device. The link protection information is used to instruct the switching device to proactively perform primary-to-secondary link switching when a link is faulty.

The processor 802 is configured to execute the instruction stored in the memory 801, establish the communication link with the destination device according to the first information, and determine, according to the link protection information, that the switching device proactively performs the primary-to-secondary link switching.

Optionally, in this embodiment of the present disclosure, that the processor 802 is configured to establish the communication link with the destination device according to the first information includes establishing the communication links with both a first destination device and a second destination device according to the first information, where the communication link established between the processor 802 and the first destination device is a primary link, and the communication link established between the processor 802 and the second destination device is a secondary link.

Optionally, in this embodiment of the present disclosure, that the processor 802 configured to determine, according to the link protection information, that the switching device proactively performs the primary-to-secondary link switching includes determining that the primary link between the processor 802 and the first destination device is faulty, and switching a working link from the primary link to the secondary link according to the link protection information.

Optionally, in this embodiment of the present disclosure, that the processor 802 configured to determine that the primary link between the processor 802 and the first destination device is faulty includes determining, by means of detection, that the primary link between the processor 802 and the first destination device is faulty, or receiving a fault notification message sent by the network controller, where the notification message is used to notify the switching device that the primary link between the switching device and the first destination device is faulty.

Optionally, in this embodiment of the present disclosure, the switching device further includes a transmitter (not shown) connected to the bus 800, and the transmitter is configured to send a switching notification message to the network controller after the processor 802 switches the working link from the primary link to the secondary link to notify the network controller that the switching device has switched the working link from the primary link to the secondary link.

Figure 9:
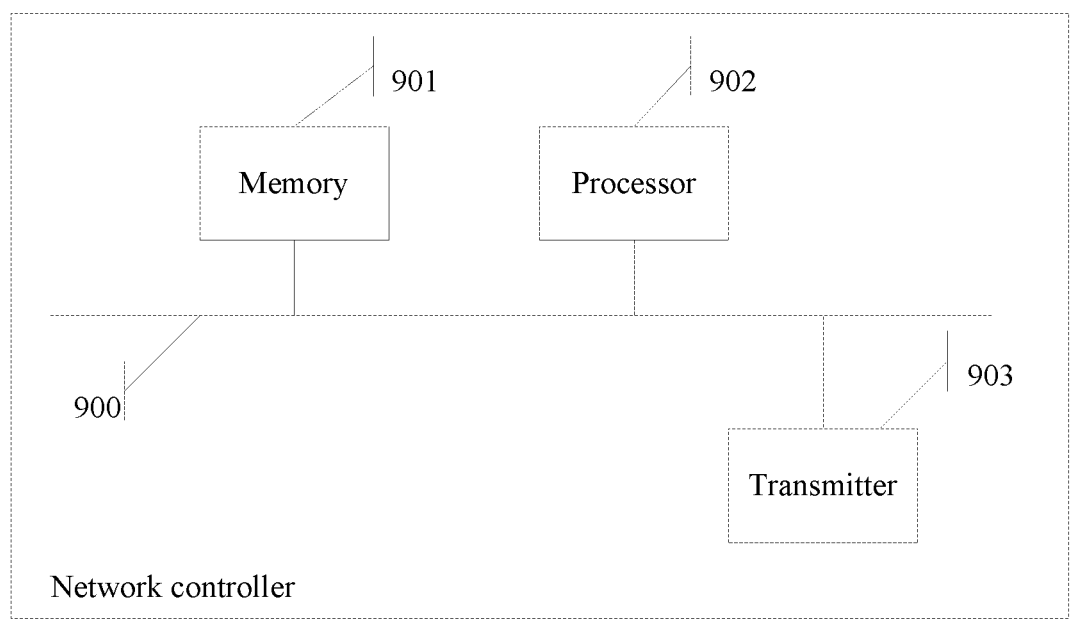
FIG. 9 is a schematic structural diagram of a network controller according to an embodiment of the present disclosure.

Referring to FIG. 9, based on a same inventive concept, an embodiment of the present disclosure provides a network controller in an SDN. The network controller includes a memory 901, a processor 902, and a transmitter 903 that are connected to a bus 900.

The memory 901 is configured to store an instruction required for performing a task by the processor 902.

The processor 902 is configured to execute the instruction stored in the memory 901, and obtain first information and link protection information. The first information is used to establish a communication link between a first switching device in the SDN and a destination device. The link protection information is used to instruct the first switching device to proactively automatically perform primary-to-secondary link switching when a link is faulty. The first switching device is controlled by the network controller.

The transmitter 903 is configured to send the first information and the link protection information to the first switching device.

Optionally, in this embodiment of the present disclosure, the network controller further includes a receiver (not shown) connected to the bus 900, and the receiver is configured to receive, after the transmitter 903 sends the first information and the link protection information to the first switching device, a switching notification message sent by the first switching device. The switching notification message is used to notify the network controller that the first switching device has switched a working link from the primary link to the secondary link.

Optionally, in this embodiment of the present disclosure, the processor 902 is further configured to execute the instruction, detect the primary link before the receiver receives the switching notification message sent by the first switching device, and send a fault notification message to the first switching device using the transmitter when determining, by means of detection, that the primary link is faulty.

Optionally, in this embodiment of the present disclosure, the processor 902 is further configured to perform protocol negotiation with both a first destination device and a second destination device to negotiate for establishment of communications networks with both the first destination device and the second destination device, where the communication link is a link corresponding to the communications network, and obtain a network link signaling negotiation result after completing the negotiation with the first destination device and the second destination device, and set the network link signaling negotiation result as the first information or a part of the first information.

It may be clearly understood by a person skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the other approaches, or all or a part of the technical solutions may be implemented in the form of a software product. The software product is stored in a storage medium and includes several instructions for instructing a computer device (which may be a personal computer, a server, a base station, or the like) or a processor to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely used to describe in detail the technical solutions of the present application. The foregoing embodiments are merely intended to help understand the method and core idea of the present disclosure, and shall not be construed as a limitation on the present disclosure. Any variation or replacement readily figured out by a person skilled in the art within the technical scope disclosed in the present disclosure shall fall within the protection scope of the present disclosure.

What is claimed is:

1. A link-protection method in a software-defined network (SDN), the link-protection method comprising:
    receiving, by a first switching device in the SDN, first information from a network controller in the SDN and link protection information, wherein the first information includes a network link signaling negotiation result between an SDN controller (SNC) and a first destination device and a network link signaling negotiation result between the SNC and a second destination device, wherein the first information further instructs the first switching device to establish communication links between the first switching device and the first destination device and between the first switching device and the second destination device, wherein the link protection information instructs the first switching device to proactively perform primary-to-secondary link switching when a link is faulty, wherein the first information comprises type information of a to-be-established link and status information of the to-be-established link, and wherein the type information of the to-be-established link comprises information about a virtual private local area network service (VPLS);
    establishing, by the first switching device, a primary link with the first destination device and a secondary link with the second destination device according to the network link signaling negotiation results between the SNC, the first destination device, and the second destination device; and
    determining, by the first switching device according to the link protection information, to automatically and proactively perform the primary-to-secondary link switching.

2. The link-protection method of claim 1, wherein determining to automatically and proactively perform the primary-to-secondary link switching comprises:
    determining, by the first switching device, that the primary link between the first switching device and the first destination device is faulty; and
    switching, by the first switching device, a working link from the primary link to the secondary link according to the link protection information.

3. The link-protection method of claim 2, wherein determining that the primary link between the first switching device and the first destination device is faulty comprises determining, by the first switching device by detection, that the primary link between the first switching device and the first destination device is faulty.

4. The link-protection method of claim 2, wherein after switching the working link from the primary link to the secondary link, the method further comprises sending, by the first switching device, a switching notification message to the network controller to notify the network controller that the first switching device has switched the working link from the primary link to the secondary link.

5. The link-protection method of claim 2, wherein determining that the primary link between the first switching device and the first destination device is faulty comprises receiving, by the first switching device, a fault notification message from the network controller, and wherein the notification message notifies the first switching device that the primary link between the first switching device and the first destination device is faulty.

6. A link-protection method in a software-defined network (SDN), the link-protection method comprising:
performing, by a network controller in the SDN, network link signaling negotiation to establish a communications link with a first destination device;
performing, by the network controller, network link signaling negotiation to establish a communications link with a second destination device;
obtaining, by the network controller, first information and link protection information, wherein the first information includes a network link signaling negotiation result between the network controller and the first destination device and a network link signaling negotiation result between the network controller and the second destination device, wherein the first information further instructs a first switching device in the SDN to establish communication links between the first switching device and the first destination device and between the first switching device and the second destination device, wherein the link protection information instructs the first switching device to proactively and automatically perform primary-to-secondary link switching when a link is faulty, wherein the first switching device is controlled by the network controller, and wherein the first information contains type information of a to-be-established link and status information of the to-be-established link, and at least one of information about an access controller (AC) side link, an AC bound interface, a pseudowire (PW) side link, PW incoming label information, PW outgoing label information, peer address information, a time to live (TTL) value, a maximum transmission unit (MTU), or a link encapsulation type; and
sending, by the network controller, the first information and the link protection information to the first switching device to instruct the first switching device to establish a primary link with a first destination device and a secondary link with a second destination device according to the network link signaling negotiation results between the network controller, the first destination device, and the second destination device.

7. The link-protection method of claim 6, wherein after sending the first information and the link protection information to the first switching device, the method further comprises receiving, by the network controller, a switching notification message from the first switching device, and wherein the switching notification message notifies the network controller that the first switching device has switched a working link from the primary link to the secondary link.

8. The link-protection method of claim 7, wherein before receiving the switching notification message from the first switching device, the method further comprises:
detecting, by the network controller, the primary link; and
sending, by the network controller, a fault notification message to the first switching device when determining, by detection, that the primary link is faulty.

9. A switching device, comprising:
a bus;
a memory coupled to the bus and configured to store an instruction;
a receiver coupled to the bus and configured to receive first information and link protection information from a network controller in software-defined networking (SDN), wherein the first information includes a network link signaling negotiation result between an SDN controller (SNC) and a first destination device and a network link signaling negotiation result between the SNC and a second destination device, wherein the first information further instructs the switching device to establish communication links between the switching device and the first destination device and between the switching device and the second destination device, wherein the link protection information instructs the switching device to proactively and automatically perform primary-to-secondary link switching when a link is faulty, wherein the first information contains the type information of a to-be-established link, and status information of the to-be-established link, and wherein the type information of the to-be-established link further comprises information about a virtual private local area network service (VPLS), a single-end or a multi-end type; and
a processor coupled to the bus, wherein the instruction causes the processor to be configured to:
establish a primary link with the first destination device and a secondary link with the second destination device according to the network link signaling negotiation results between the SNC, the first destination device, and the second destination device; and
determine, according to the link protection information, instructions to proactively and automatically perform the primary-to-secondary link switching.

10. The switching device of claim 9, wherein the instruction further causes the processor to be configured to:
determine that the primary link between the switching device and the first destination device is faulty; and
switch a working link from the primary link to the secondary link according to the link protection information.

11. The switching device of claim 10, wherein the instruction further causes the processor to be configured to determine, by detection, that the primary link between the switching device and the first destination device is faulty.

12. The switching device of claim 10, further comprising a transmitter coupled to the memory, the processor, and the receiver by the bus, wherein the transmitter is configured to send a switching notification message to the network controller after the processor switches the working link from the primary link to the secondary link to notify the network controller that the switching device has switched the working link from the primary link to the secondary link.

13. The switching device of claim 10, wherein the instruction further causes the processor to be configured to receive a fault notification message from the network controller, and wherein the fault notification message notifies the switching device that the primary link between the switching device and the first destination device is faulty.

14. A network controller, comprising:
a bus;
a transmitter coupled to the bus;
a receiver coupled to the bus;
a memory coupled to the bus and storing at least one instruction;
a processor coupled to the bus, wherein the at least one instruction causes the processor to be configured to:
perform network link signaling negotiation to establish communications with a first destination device via the transmitter and receiver;
perform network link signaling negotiation to establish communications with a second destination device via the transmitter and receiver;
obtain first information and link protection information, wherein the first information includes a network link signaling negotiation result between the network controller and the first destination device and a network link signaling negotiation result between the network controller and the second destination device, wherein the first information further instructs a first switching device in a software defined network (SDN) to establish communication links between the first switching device and the first destination device and between the first switching device and the second destination device, wherein the link protection information instructs the first switching device to proactively and automatically perform primary-to-secondary link switching when a link is faulty, wherein the first information contains the type information of a to-be-established link and status information of the to-be-established link, wherein the type information of the to-be-established link further comprises at least one of information about, a single-end or a multi-end type, and wherein the first switching device is controlled by the network controller; and
send, via the transmitter, the first information and the link protection information to the first switching device to instruct the first switching device to establish a primary link with the first destination device and a secondary link with the second destination device according to the network link signaling negotiation results between the network controller, the first destination device, and the second destination device.

15. The network controller of claim 14, wherein the receiver is configured to receive a switching notification message from the first switching device after the transmitter sends the first information and the link protection information to the first switching device, and wherein the switching notification message notifies the network controller that the first switching device has switched a working link from the primary link to the secondary link.

16. The network controller of claim 15, wherein the at least one instruction further causes the processor to be configured to:
detect the primary link before the receiver receives the switching notification message from the first switching device; and
send a fault notification message to the first switching device using the transmitter when determining, by detection, that the primary link is faulty.

17. The network controller of claim 15, wherein the type information of a to-be-established link comprises type information of to-be-established links between the first switching device and the first and second destination devices.

18. The network controller of claim 17, wherein the first information comprises at least one of the type information and a link attribute information, and wherein the type information comprises a virtual private local area network (LAN) service (VPLS).

19. The network controller of claim 18, wherein the link attribute information comprises information about an access controller (AC) side link, an AC bound interface, a pseudowire (PW) side link, PW incoming label information, PW outgoing label information, peer address information, a time to live (TTL) value, a maximum transmission unit (MTU), or a link encapsulation type.

20. The network controller of claim 15, wherein the first information comprises link attribute information.

* * * * *